US007640097B2

(12) United States Patent
Boutonnet et al.

(10) Patent No.: US 7,640,097 B2
(45) Date of Patent: Dec. 29, 2009

(54) METHOD FOR ASSISTING IN STARTING A MOTOR VEHICLE AND CORRESPONDING DEVICE

(75) Inventors: Francis Boutonnet, Boulogne Billancourt (FR); Alexandre Pineau, Caluire et Cuire (FR); Pascal Rey, Mennecy (FR)

(73) Assignee: Renault s. a. s., Boulogne Billancourt (FR)

( * ) Notice: Subject to any disclaimer, the term of this patent is extended or adjusted under 35 U.S.C. 154(b) by 364 days.

(21) Appl. No.: 11/722,116

(22) PCT Filed: Dec. 12, 2005

(86) PCT No.: PCT/FR2005/051075

§ 371 (c)(1),
(2), (4) Date: Jun. 19, 2007

(87) PCT Pub. No.: WO2006/067346

PCT Pub. Date: Jun. 29, 2006

(65) Prior Publication Data

US 2009/0095255 A1   Apr. 16, 2009

(30) Foreign Application Priority Data

Dec. 20, 2004  (FR) .................................. 04 13598

(51) Int. Cl.
*F02D 45/00*  (2006.01)
(52) U.S. Cl. .................................................... 701/113
(58) Field of Classification Search .................. 701/113, 701/102, 115; 123/350, 179.3; 477/86
See application file for complete search history.

(56) References Cited

U.S. PATENT DOCUMENTS

| 4,638,898 | A  | * | 1/1987 | Braun ........................ 477/86 |
| 6,281,646 | B1 | * | 8/2001 | Masberg et al. ............. 318/139 |
| 2004/0112336 | A1 | | 6/2004 | Badillo et al. |

FOREIGN PATENT DOCUMENTS

| DE | 19524412 | 9/1996 |
| DE | 19806665 | 8/1999 |
| DE | 10225448 | 12/2003 |
| EP | 0821150 | 1/1998 |

* cited by examiner

*Primary Examiner*—Hieu T Vo
(74) *Attorney, Agent, or Firm*—Oblon, Spivak, McClelland, Maier & Neustadt, L.L.P.

(57) ABSTRACT

A method for assisting starting of a motor vehicle by application of engine torque on starting the vehicle. In the method parameters for detection of the starting of the motor vehicle are recorded. A set point for engine management is calculated from a parameter for the driver's command. A torque for assisting the start is determined from the engine management set point. The torque assistance is used on starting the vehicle from zero speed to a non-zero speed and the set point for the engine management is calculated as a function of different values for the moment of inertia of the engine. The change from one first value to a second value is carried out on there being a given difference between the engine management value and the measured value.

9 Claims, 2 Drawing Sheets

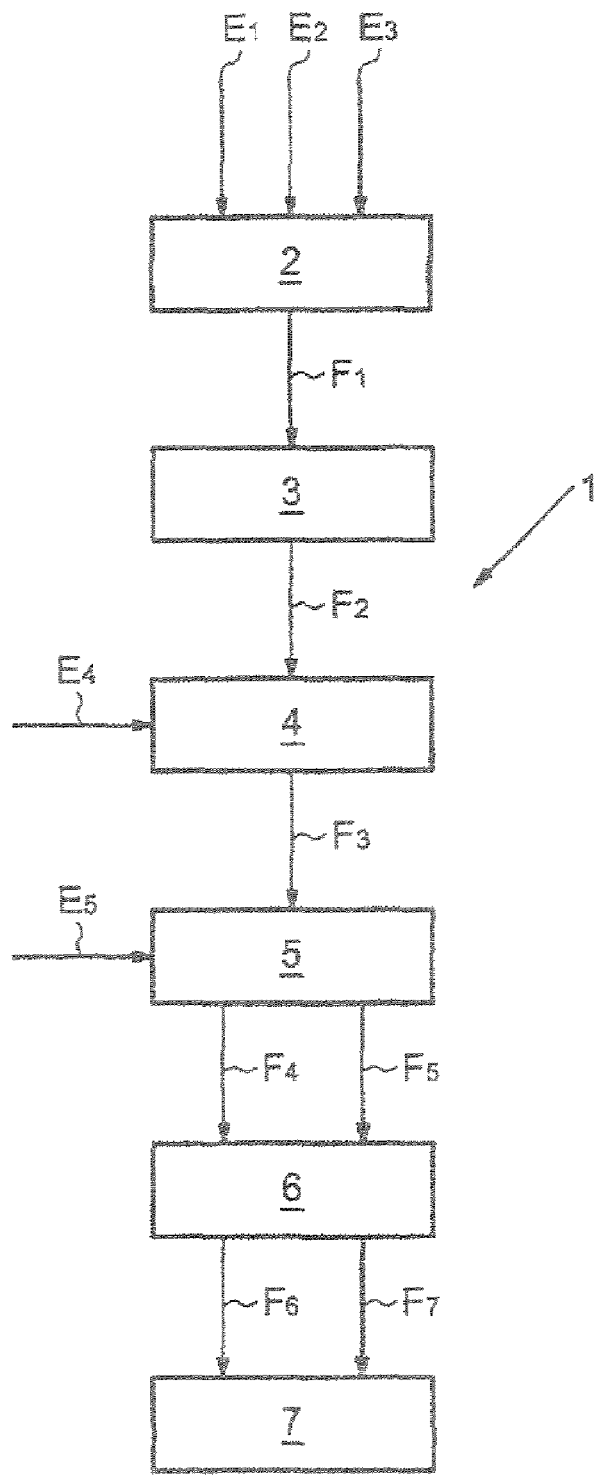

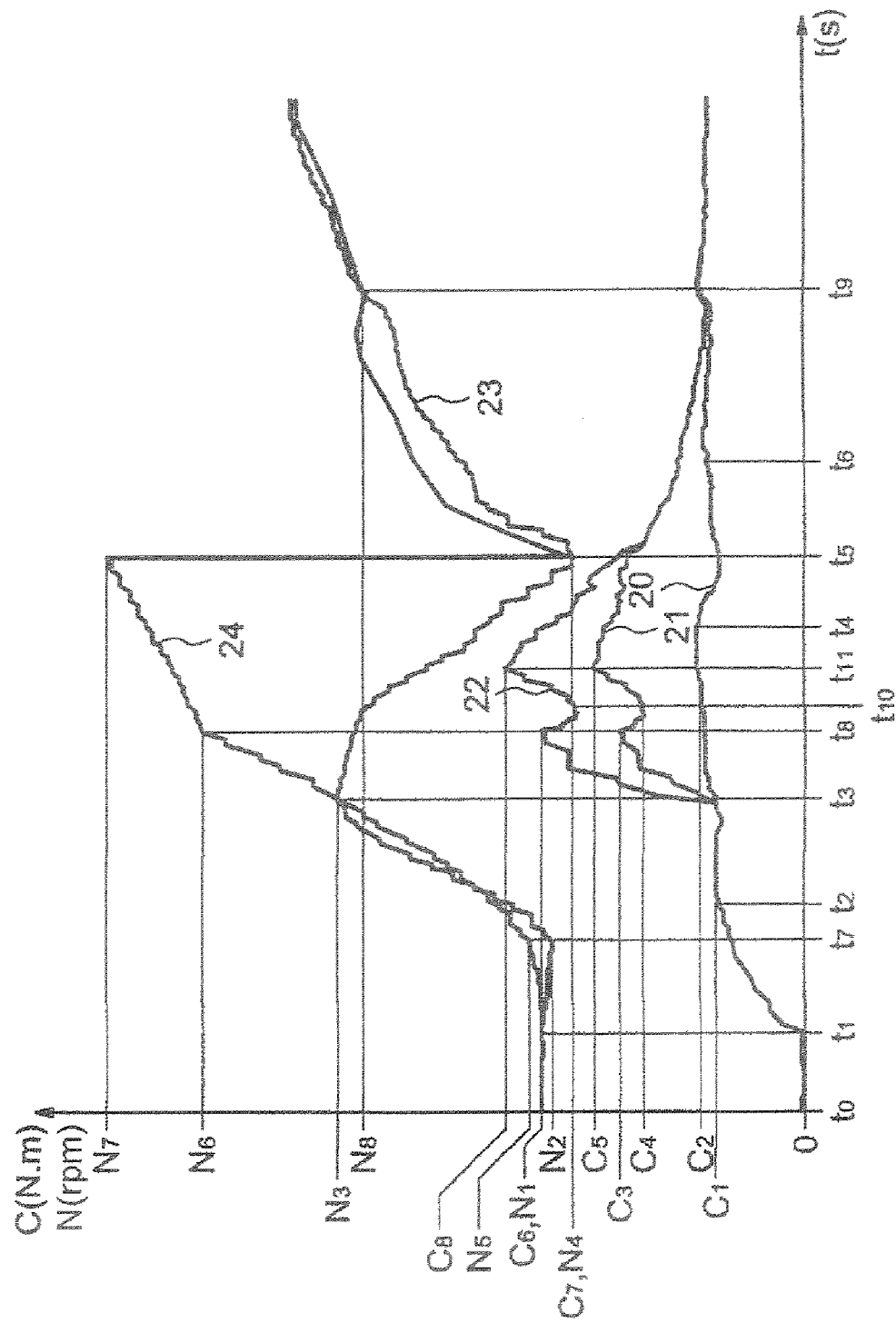

METHOD FOR ASSISTING IN STARTING A MOTOR VEHICLE AND CORRESPONDING DEVICE

The present invention relates to a method for assisting with starting a motor vehicle by adding engine torque as said vehicle starts, and to an associated device.

The invention relates more particularly to a method for assisting with starting a motor vehicle that can be used on all kinds of vehicle fitted with a mechanical gearbox and allowing control over the engine operating speed, while the vehicle is starting, so as to obtain particularly satisfactory driveability. The expression "starting" applied to the starting of the vehicle is to be understood as meaning the transition from a condition in which the vehicle speed is zero and the gearbox is disengaged, to a condition in which the vehicle speed is non zero and the gearbox is engaged.

At the present time, in order to improve the feeling of comfort when setting a motor vehicle in motion from a stationary position, the objective is to reduce as far as possible any breaks in the continuity of the forward motion of the vehicle. Such breaks may be caused by the overall increase in weight of vehicles and the increase in the volume of the engine manifold which appreciably degrade engine torque in terms of response time.

One known way of achieving this is to use a method for assisting with starting a motor vehicle in which, having detected a non-zero vehicle speed and a decreasing engine speed, an engine operating speed setpoint is calculated and a step-up gain factor that sa function of the difference between the engine operating speed setpoint and the measured engine operating speed is applied to the measured engine torque.

A method such as this for assisting with starting has the disadvantage that it does not allow precise compensation of the engine torque to be applied, leading to a reduction in the linearity of the clutch pedal, making it difficult for the driver to start smoothly.

It is therefore an object of the present invention to overcome this disadvantage and to provide a method for assisting with starting a motor vehicle by adding engine torque that makes it possible to obtain optimum driveability.

To these ends, a subject of the invention is a method for assisting with starting a motor vehicle by adding engine torque as said vehicle starts, involving the steps during which:
- parameters able to detect that the motor vehicle is starting are determined,
- an engine operating speed setpoint is calculated from a parameter able to detect the driver's wishes,
- a starting assistance torque is determined from the operating speed setpoint, and
- the assistance torque is used as the vehicle starts from a zero speed to non-zero speed,
- the operating speed setpoint is calculated as a function of various values of the moment of inertia of the engine, the switch from a first value to a second value occurring beyond a predetermined difference between the engine operating speed and a measured operating speed.

With such a method for assisting with starting it thus becomes possible to obtain a starting assistance toque that can be added to the engine torque to give driveability tailored directly to the driver's wishes. The additional torque is determined from the driver's wishes making it possible to estimate particularly precisely the amount of torque to add.

Such method for assisting with starting has the advantage that it is able to switch between a moment of inertia corresponding to a condition in which the vehicle gearbox is disengaged and a moment of inertia corresponding to a condition in which the gearbox is engaged depending on the measured operating speed, so as to obtain a best estimate of the level of torque to be added and thus avoid any possible break in the continuity of the forward motion of the vehicle during the starting phase.

In one embodiment of the method, the engine operating speed setpoint is calculated incorporating a filtering term so as to obtain a substantially stable operating speed.

As a preference, the starting assistance torque is determined by differentiating the difference between the engine operating speed setpoint and the engine operating speed.

As a preference, the engine is operated, while the assistance torque is being used, in such a way as to obtain a reserve of torque.

With such a method for assisting with starting it thus becomes possible, while at the same time observing the torque required by the driver, to keep a reserve of torque, through an engine strategy, so that it is possible to respond instantly to any additional torque requirement without being dependent upon the dynamics of the air intake which are connected with the size of the engine manifold.

In one embodiment of the method, the engine is operated in such way as to obtain a variable reserve of torque which exhibits a maximum value when the vehicle begins to start and a minimum value when the vehicle finishes starting.

As a preference, the engine is operated as a function of a pumped air flow rate setpoint and of an estimated air low rate.

Another subject of the invention is a device for assisting with the starting of a motor vehicle by adding engine torque as said vehicle starts, comprising a determining means for determining parameters able to detect that the motor vehicle is starting, an estimating means for estimating an engine operating speed setpoint from a parameter able to detect the driver's wishes, and a calculating means for calculating a starting assistance torque from the speed setpoint in such a way as to use said assistance torque when the vehicle is starting from a zero speed to a non-zero speed.

The parameters representative of the starting of the motor vehicle comprise a parameter representative of the depression of the throttle pedal and/or a parameter representative of the ratio between the speed of the vehicle and the engine operating speed.

Using such a device it thus becomes possible to determine a starting assistance torque without knowing whether the clutch is in or out, thus making the method compatible with a great many engine control techniques.

The invention and its advantages will be better understood from studying the description of an entirely nonlimiting embodiment illustrated by the attached drawings in which:

FIG. 1 is a block diagram of the device for assisting with starting according to the present invention; and FIG. 2 is a graph illustrating the change in engine speed and torque as a function of time, during the starting phase.

FIG. 1 depicts the overall architecture of a device for assisting with starting according to the invention, denoted by the overall numerical reference 1. In this figure, the arrows F1 to F7 correspond to phases of the starting assistance method according to the invention. The device 1 comprises a determining module 2 for determining parameters representative of the starting of the motor vehicle, an estimating module 3 for estimating the engine operating speed setpoint, and which communicates with the determining module 2, and calculating module 4 which is duly programmed to calculate a starting assistance torque to be added to the engine torque in order to obtain satisfactory driveability and which communicates with the estimating module 3. The device 1 is also provided with a management module 5 for managing the starting assistance torque, with control means 6 for controlling the vehicle engine and which communicates with the management module 5, and with a monitoring means 7 for monitoring the starting assistance torque and which is connected to the control means 6.

The determining module 2 receives on its respective inputs $E_1$, $E_2$ and $E_3$, data representative of the extent to which the throttle pedal Pedacc of the vehicle is depressed, of the speed Vveh of the vehicle, and the engine operating speed N of the vehicle, these data being supplied by appropriate sensors used to determine and assess two conditions for activating the assistance with starting.

From these data, in order to determine whether the first activation condition is satisfied, the determining module 2 calculates the ratio between the speed Vveh of the vehicle and the engine operating speed N:

$$\frac{Vveh}{N}$$

and said ratio is then compared against a reference value termed Vthou. The reference value Vthou is chosen to characterize the length of the gears. This value is thus defined by the speed that the motor vehicle reaches when the engine speed is 1000 rpm. For example, a first gear of a gearbox may be characterized by a Vthou value of 7 km/h at 1000 rpm. The expression "a Vthou value of 7 km/h at 1000 rpm" is to be understood here as meaning a motor vehicle that moves along at a speed of 7 km/h for an engine speed of 1000 rpm when the gearbox is in first gear. The reference value Vthou at which the ratio $$\frac{Vveh}{N},$$

is compared, is the Vthou value for first gear.

The determining module 2 thus compares the ratio of the speed Vveh of the vehicle and the engine operating speed N against the reference value Vthou, using a comparator (not depicted). If said ratio is below the reference value Vthou then the first condition for activating the assistance with starting the vehicle is satisfied.

The determining module 2 also detects the torque required by the driver of the vehicle through the depression of the throttle pedal Pedacc, which is measured by a sensor (not depicted). The second condition for activation is satisfied when the driver is depressing the throttle pedal.

When the determining module 2 has detected that the conditions for activating the assistance with starting the vehicle are satisfied, it produces an information item representative of activation of the assistance with pullaway and transmits it to the estimating module 3 (arrow $F_1$).

The estimating module 3, from the depression of the throttle pedal which corresponds to a predetermined torque setpoint, estimates the operating speed setpoint. This operating speed setpoint is calculated using the following equation E:

$$N_{sp}(i) = N_{sp}(i-1) + \frac{dt}{J}[kC + (1-K)K(N - N_{sp}(i-1)]$$

where $N_{sp}(i)$ corresponds to the engine operating speed setpoint at the instant i, $N_{sp}(i-1)$ corresponds to the engine operating speed setpoint at the instant i−1, J corresponds to the moment of inertia of the vehicle engine, C is the torque required by the driver, N is the engine operating speed, k is a stabilizing coefficient, and K is a filtering constant.

The stabilizing coefficient k can be calculated from calibratable maps dependent on the motor vehicle speed Vveh, the ratio between the vehicle speed and the engine operating speed $$\frac{Vveh}{N},$$

and the torque required by the driver C, it being possible for said data Vveh, $$\frac{Vveh}{N}$$

and C to be read or interpreted from a memory or variable with conditions representative of the signals describing the environment of the vehicle.

The stabilization coefficient k can be calculated as follows:

$$k = \left[1 - f_2\left(\frac{Vveh}{N}\right)f_3\left(\frac{dC}{dt}\right)\right]$$

which $f_2$ is a function of $$\frac{Vveh}{N}$$

and represents the possibility of being in a pullaway phase, in the light of the $$\frac{Vveh}{N}$$

information, and $f_3$ is a function of $$\frac{dC}{dt}$$

and represents the possibility of being in a pullaway phase, in the light of the torque information.

The stabilization coefficient k makes it possible to detect a substantially constant demand for torque by the driver and to activate the first-order filter defined by $K(N-N_{sp}(i-1)$, the stabilizing coefficient k being equal to unity when the demand for torque is variable Said first-order filter makes it possible to avoid divergence in the calculation of the engine operating speed setpoint by the estimating module 3.

During the calculation process, the estimating module 3 first of all determines the value of the operating speed setpoint by using a first value $J_1$ of the moment of inertia of the engine corresponding to a condition in which the gearbox is disengaged. When the difference between the operating speed setpoint thus determined and the measured engine operating speed exceeds a threshold value $N_{thr}$, the estimating module 3 uses a second value $J_2$ of the moment of inertia of the engine corresponding to a condition in which the gearbox is in first gear in order to determine the value of the operating speed setpoint.

The estimating module 3 then transmits the value representative of the operating speed setpoint to the calculating module 4 for calculating the starting assistance torque (arrow $F_2$).

The calculating module 4 also receives, on one of its inputs $E_4$ the information relating to the measured engine operating speed. The calculating module 4 then makes a comparison between the operating speed setpoint and the measured operating speed, using a comparator (not depicted). Depending on the difference between the operating speed setpoint and the operating speed, the calculating module 4 then determines the starting assistance torque to be added to the engine torque in order to obtain satisfactory driveability. The starting assistance torque is calculated using a proportional derivative corrector (not depicted) and is transmitted to the starting assistance torque management module 5 (arrow $F_3$).

The management module 5 receives, on input $E_5$, the information relating to the torque setpoint demanded by the driver via the throttle pedal. The management module 5 determines a first torque value corresponding to the starting assistance torque and to the demanded torque setpoint, and a second torque value corresponds to a reserve of torque higher than the first torque setpoint.

The first torque value corresponds to a first torque setpoint value $C_a$ that the engine is to achieve by varying the ignition advance with respect to an optimum advance position. The optimum advance position is the position for which the maximum torque is achieved for a given operating point. The expression "ignition advance" is to be understood here as meaning the angle through which the crankshaft rotates between the instant when the engine ignition element produces a spark and the instant when the piston is at top dead center. The ignition advance corresponding to the first torque setpoint value may, for example, be 20°.

The second torque value $C_b$ corresponds to a second torque setpoint value that the engine is to achieve by opening the throttle and operating at a maximum advance position. Said first and second setpoints are both transmitted to the engine control means 6 (arrows $F_4$ and $F_5$).

The control means 6 controls the ignition advance and the engine throttle valve by downgrading the ignition advance that corresponds to the first setpoint value, for example to obtain an angle of 5°, and excessively opening the throttle, to obtain a torque value equal to the first setpoint value. Through this engine strategy the torque setpoint demanded by the driver and the assistance torque is met while at the same time ensuring contingency or reserve of torque rapidly available by altering the ignition advance without having to be dependent on the dynamics of the air intake which are connected mainly with the size of the engine manifold.

The control means 6 transmits to the monitoring means 7 (arrows $F_6$ and $F_7$) a pumped air flow rate setpoint $Q_{sp}$ for the air pumped by the engine and an estimated pumped flow rate $Q_{estimated}$. If the value of the low rate setpoint $Q_{sp}$ is below the estimated flow rate $Q_{estimated}$, then the torque provided by the engine is reduced by downgrading the ignition advance. By contrast, if the flow rate setpoint value $Q_{sp}$ is above the estimated flow rate $Q_{estimated}$, then the torque provided by the engine is increased by altering the ignition advance and using up the available torque contingency so that said torque contingency is practically zero when the motor vehicle finishes starting.

In FIG. 2, the curves 20 to 22 respectively show the change in engine toque setpoint and in said torque values $C_a$ and $C_b$ as a function of time, curves 23 and 24 illustrating the change in operating speed and in engine operating speed setpoint as a function of time.

Curve 20, determined by the depression of the throttle pedal by the driver of the motor vehicle, has a first portion, between the instant $t_0$ and the instant $t_1$ which exhibits a practically zero torque setpoint. A second portion of the curve 20 increases progressively from the Instant $t_1$ to the instant $t_2$ to reach a torque setpoint $C_1$, for example 35 N·m, then continues along a third portion, between the instant $t_2$ and the instant $t_3$, more or less constant about the torque setpoint $C_1$. A fourth portion of the curve 20, between the instant $t_3$ and the instant $t_4$ is more or less constant about a torque setpoint $C_2$, for example 45 N·m. A fifth portion shows a decrease, between the instant $t_4$ and the instant $t_5$ more or less down to the torque setpoint $C_1$. A sixth portion of the curve is more or less increasing, from the instant $t_5$ to the instant $t_6$ until it more or less reaches the torque setpoint $C_2$. From the instant $t_6$ on, the torque setpoint is more or less constant.

Curve 23, which represents the change in engine operating speed as detected by a sensor, has a first portion, between the instant $t_0$ and the instant $t_1$, that is more or less constant about an engine speed $N_1$, for example 660 rpm. A second portion of the curve 23, between the instant $t_1$ and the instant $t_7$, more or less decreases from said speed $N_1$ to a speed $N_2$, for example 630 rpm. A third portion increases linearly, between the instant $t_7$ and the instant $t_3$ to reach a rotational speed $N_3$, for example 1200 rpm. A fourth portion, between the instant $t_3$ and the instant $t_5$, decreases to a minimum speed $N_4$, for example 600 rpm. A fifth portion of the curve 20, from the instant $t_5$ onwards, is more or less an increasing portion.

Curve 24, which illustrates the change in engine operating speed setpoint is determined from equation E and from curves 20 and 23 described above.

A first portion of curve 24 is more or less coincident with the portion of the curve 23 between the instant $t_0$ and the instant $t_1$. A second portion, between the instant $t_1$ and the instant $t_7$, increases up to a speed $N_5$, for example 100 rpm. A third portion, between the instant $t_7$ and the instant $t_8$, increases linearly to a speed $N_6$, for example 1600 rpm. A fourth portion between the instant $t_8$ and the instant $t_5$ increases to a speed $N_7$, for example 1900 rpm, at a gradient that is not as steep as the gradient of the second portion. At the instant $t_5$, the operating speed setpoint drops abruptly to the rotational speed $N_4$. A fifth portion, between the instant $t_8$ and the instant $t_9$ increases up to a speed $N_8$, for example 1100 rpm. A sixth portion of the curve, from the instant $t_9$ onwards, is more or less coincident with the portion of the curve 20 from the instant $t_4$ onwards.

Curve 21, which represents the change in setpoint torque and pullaway assistance torque comprises a first portion more or less coincident with part of the curve 22, between the instant $t_0$ and the instant $t_3$. A second portion between the instant $t_3$ and the instant $t_8$ increases up to a torque value $C_3$, for example 80 N·m, and is continued by a third portion which decreases, between the instant $t_8$ and the instant $t_{10}$ to a torque value $C_4$, for example 65 N·m. A fourth portion more or less increases, between the instant $t_{10}$ and the instant $t_{11}$ to a torque value $C_5$, for example 90 N·m. A fifth portion more or less decreases, between the instant $t_{11}$ and the instant $t_9$ and then coincides with the curve 20 from the instant $t_9$ onwards.

Curve 22 which represents the change in the available reserve of torque, has an overall appearance more or less equivalent to that of the curve 21. A first portion is more or less coincident with the curve 21, between the instant $t_0$ and the instant $t_3$. A second portion, between the instant $t_3$ and the instant $t_8$ increases to a torque value $C_6$, or example 120 N·m, and is continued by a third portion that decreases, between the instant $t_8$ and the instant $t_{10}$, down to a torque value $C_7$, for example 100 N·m. A fourth portion more or less increases, between the instant $t_{10}$ and the instant $t_{11}$ to a torque value for example 135 N·m. A fifth portion more or less decreases, between the instant $t_{11}$ and the instant $t_5$, then coincides with the curve 21.

The present invention thus makes it possible to obtain a starting assistance torque that is added to the engine torque to give driveability directly tailored to the driver's wishes while at the same time, by virtue of an engine strategy, making it possible to maintain a reserve of torque available in order to be able to respond rapidly to the wishes of the driver of the motor vehicle.

The invention claimed is:

1. A device for assisting with starting of a motor vehicle by adding engine torque as the vehicle starts, comprising:
   determining means for determining parameters able to detect that the motor vehicle is starting;
   estimating means for estimating an engine operating speed setpoint from a parameter able to detect a driver's wishes; and
   calculating means for calculating a starting assistance torque from the speed setpoint such as to use assistance torque when the vehicle is starting from a zero speed to a non-zero speed, wherein the calculating means calculates the operating speed setpoint as a function of values of moment of inertia of the engine, a switch from a first value to a second value occurring beyond a predetermined difference between the engine operating speed and a measured operating speed.

2. The device as claimed in claim 1, wherein the parameters representative of the starting of the motor vehicle comprise a parameter representative of depression of a throttle pedal.

3. The device as claimed in claim 1, herein the parameters representative of the starting of the motor vehicle comprise a parameter representative of a ratio between the speed of the vehicle and the engine operating speed.

4. A method for assisting with starting a motor chide by adding engine torque as the vehicle starts, comprising:
   determining parameters able to detect that the motor vehicle is starting;
   calculating an engine operating speed setpoint from a parameter able to detect a driver's wishes;
   determining a starting assistance torque from the operating speed setpoint; and
   using assistance torque as the vehicle starts from a zero speed to a non-zero speed, wherein the operating speed setpoint is calculated as a function of values of moment of inertia of the engine, a switch from a first value to a second value occurring beyond a predetermined difference between the engine operating speed and a measured operating speed.

5. The method as clamed in claim 4, wherein the engine operating speed setpoint is calculated incorporating a filtering term so as to obtain a substantially stable operating speed.

6. The method as claimed in claim 4, wherein the starting assistance torque is determined by differentiating the difference between the engine operating speed setpoint and the engine operating speed.

7. The method as claimed in claim 4, wherein the engine is operated, while the assistance torque is being used, such as to obtain a reserve of torque.

8. The method as claimed in claim 7, wherein the engine is operated such as to obtain a variable reserve of torque that exhibits a maximum value when the vehicle begins to start and a minimum value when the vehicle finishes starting.

9. The method as claimed in claim 7, wherein the engine is operated as a function of a pumped air flow rate setpoint and of an estimated air flow rate.

* * * * *